(12) United States Patent
Riedel et al.

(10) Patent No.: US 10,343,530 B2
(45) Date of Patent: Jul. 9, 2019

(54) METHOD FOR BRAKING A VEHICLE, AND VEHICLE

(71) Applicant: VOLKSWAGEN AG, Wolfsburg (DE)

(72) Inventors: Stephan Riedel, Wolfsburg (DE); Stephan Alm, Braunschweig (DE)

(73) Assignee: Volkswagen AG (DE)

( * ) Notice: Subject to any disclaimer, the term of this patent is extended or adjusted under 35 U.S.C. 154(b) by 121 days.

(21) Appl. No.: 14/910,908

(22) PCT Filed: Jul. 25, 2014

(86) PCT No.: PCT/EP2014/066064
§ 371 (c)(1),
(2) Date: Feb. 8, 2016

(87) PCT Pub. No.: WO2015/018669
PCT Pub. Date: Feb. 12, 2015

(65) Prior Publication Data
US 2016/0185228 A1 Jun. 30, 2016

(30) Foreign Application Priority Data
Aug. 8, 2013 (DE) .......... 10 2013 215 670

(51) Int. Cl.
*B60L 7/26* (2006.01)
*B60L 7/00* (2006.01)
(Continued)

(52) U.S. Cl.
CPC .......... *B60L 7/26* (2013.01); *B60L 3/108* (2013.01); *B60L 7/10* (2013.01); *B60L 7/22* (2013.01);
(Continued)

(58) Field of Classification Search
CPC .... B60L 7/26; B60L 3/108; B60L 7/10; B60L 7/22; B60L 15/2009; B60W 10/00
See application file for complete search history.

(56) References Cited

U.S. PATENT DOCUMENTS

| 5,511,859 A * | 4/1996 | Kade .................. B60K 6/442 |
| | | 188/156 |
| 2014/0257664 A1* | 9/2014 | Arbitmann ............ B60T 1/10 |
| | | 701/71 |

FOREIGN PATENT DOCUMENTS

| DE | 4435953 A1 | 5/1995 |
| DE | 102009009647 A1 | 8/2010 |

(Continued)

OTHER PUBLICATIONS

Search Report for German Patent Application No. 10 2013 215 670.7; dated Jan. 13, 2014.
(Continued)

*Primary Examiner* — Adam D Tissot
(74) *Attorney, Agent, or Firm* — Barnes & Thornburg LLP

(57) ABSTRACT

A method for braking a vehicle, which is moving along a carriageway, by a braking device which has at least one friction brake and at least one regenerative brake for braking at least one wheel of the vehicle, wherein an anti-lock braking operation is carried out by the braking device, at least one braking torque which is to be applied to the wheel by the braking device being at least temporarily limited to a prespecifiable value by a regulating device of the vehicle during the anti-lock braking operation to at least temporarily prevent locking of the wheel relative to the carriageway, wherein the braking torque for braking the wheel is applied to the wheel at least partially by the regenerative brake at
(Continued)

least during a portion of the anti-lock braking operation, and also to a vehicle which executes the disclosed method.

11 Claims, 2 Drawing Sheets

(51) Int. Cl.
*B60T 13/00* (2006.01)
*B60T 13/74* (2006.01)
*B60L 7/10* (2006.01)
*B60L 3/10* (2006.01)
*B60L 7/22* (2006.01)
*B60L 15/20* (2006.01)

(52) U.S. Cl.
CPC ..... *B60L 15/2009* (2013.01); *B60L 2240/423* (2013.01); *Y02T 10/645* (2013.01); *Y02T 10/72* (2013.01); *Y02T 10/7275* (2013.01)

(56) References Cited

FOREIGN PATENT DOCUMENTS

| | | |
|---|---|---|
| DE | 102010003076 A1 | 8/2011 |
| DE | 102010062387 A1 | 9/2011 |
| DE | 102010054620 A1 | 3/2012 |
| DE | 102012217679 A1 | 4/2013 |
| JP | 2007282406 A | 10/2007 |

OTHER PUBLICATIONS

Search Report for International Patent Application No. PCT/EP2014/066064; dated Mar. 17, 2015.

* cited by examiner

METHOD FOR BRAKING A VEHICLE, AND VEHICLE

PRIORITY CLAIM

This patent application is a U.S. National Phase of International Patent Application No. PCT/EP2014/066064, filed 25 Jul. 2014, which claims priority to German Patent Application No. 10 2013 215 670.7, filed 8 Aug. 2013, the disclosures of which are incorporated herein by reference in their entirety.

FIELD

Illustrative embodiments relate to a method for braking a vehicle, in particular a motor vehicle, and to a vehicle, in particular a motor vehicle.

BACKGROUND

Methods and vehicles of this type are sufficiently known from the general prior art, in particular from the mass production of passenger cars. The vehicle comprises at least one wheel by means of which the vehicle can roll on a roadway and as a result move along the roadway. If the vehicle is embodied, for example, as an at least two-track motor vehicle, the vehicle comprises at least two axles which are arranged spaced apart from one another in the longitudinal directions of the vehicle. These axles each comprise at least two wheels by means of which the vehicle can roll on the roadway. At least one of the wheels is a driven wheel by means of which the vehicle can be driven. The two wheels are usually wheels which are driven at least one of the axles.

If, for example, the wheels of the front axle are the driven wheels, the vehicle is embodied as a front-drive vehicle or as a vehicle with front wheel drive if the wheels of the rear axle are not driven. The rear axle is then what is referred to as a trailing axle, while the front axle is a driven axle. Conversely, the vehicle is embodied as a rear drive vehicle or as a vehicle with rear drive if the wheels of the rear axle are the driven wheels while the wheels of the front axle are not driven. If the wheels of both axles are driven, the vehicle has all-wheel drive or four-wheel drive.

The vehicle also comprises a brake device by means of which the vehicle which is moving along the roadway can be braked. For this purpose, at least one of the wheels of the vehicle is braked by means of the brake device. To brake the at least one wheel, at least one braking torque is applied to the wheel by the brake device.

In vehicles or motor vehicles with a conventional drive, the brake device comprises for this purpose at least one friction brake which is assigned to the wheel and by means of which the wheel can be braked. Such a friction brake comprises, for example, a brake disk which is coupled in rotationally fixed fashion to the wheel and a brake caliper which is attached to a wheel carrier and is therefore fixed to the body and by means of which the brake disk which rotates along with the wheel can be braked. The friction brake is usually activated hydraulically, with the result that the friction brake is therefore embodied as a hydraulic brake.

In vehicles or motor vehicles with alternative drives, for example in hybrid vehicles, the brake device also comprises at least one so-called recuperative brake. By means of such a recuperative brake, energy can be recovered during the braking of the wheel and therefore of the vehicle in that, for example, during the braking of the vehicle kinetic energy is converted via the recuperative brake into electrical energy, that is to say electric current. For this purpose, the recuperative brake comprises, for example, at least one generator which is driven by the wheel to brake the wheel and as a result converts mechanical energy into electrical energy. The electrical energy which is acquired or recovered in this way can be stored in at least one electrical storage device, in particular in a battery, of the hybrid vehicle.

The total braking torque which is to be applied to the wheel by the brake device is predefined, for example, by the driver of the vehicle in such a way that the driver activates, in particular presses, a brake pedal. The braking torque which is requested as a result can then be applied to the wheel, for example partially by the friction brake and partially by the recuperative brake.

Furthermore, anti-lock brake systems, which are usually also referred to as automatic lock preventers, are known from the general prior art. Such anti-lock brake systems serve to carry out braking operations with at least virtually maximum utilization of the frictional engagement between the tire and the roadway, referred to as anti-lock braking operations. In such an anti-lock braking operation, the braking torque which is to be applied to the at least one wheel by the brake device is limited at least temporarily to a predefinable value by means of a regulating device of the anti-lock brake system, to prevent, at least temporarily, the wheel from locking relative to the roadway.

This limitation of the braking torque is carried out, for example, as a function of at least one regulating value which characterizes the slip of the wheel relative to the roadway. The idea on which such an anti-lock brake system is based is that maximum braking decelerations can be achieved as a function of the state of the roadway and the tire of the wheel given specific slip values. By limiting the braking torque, the braking torque is set in such a way that, at least during the greater part of the anti-lock braking operation, the slip is as close as possible to the optimum slip value for the greatest possible braking deceleration, with the result that, on the one hand, very strong deceleration or braking of the vehicle can be implemented but, on the other, the wheel can be prevented from locking. As result, the vehicle continues, for example, to be steerable and stable, since the non-locking wheel can still absorb lateral guidance forces.

Illustrative embodiments provide a method and a vehicle wherein the operating mode of the vehicle is particularly efficient in terms of consumption of energy.

BRIEF DESCRIPTION OF THE FIGURES

Disclosed embodiments will be explained below with reference to the drawings, in which.

DETAILED DESCRIPTION OF THE DISCLOSED EMBODIMENTS

Figure 1:
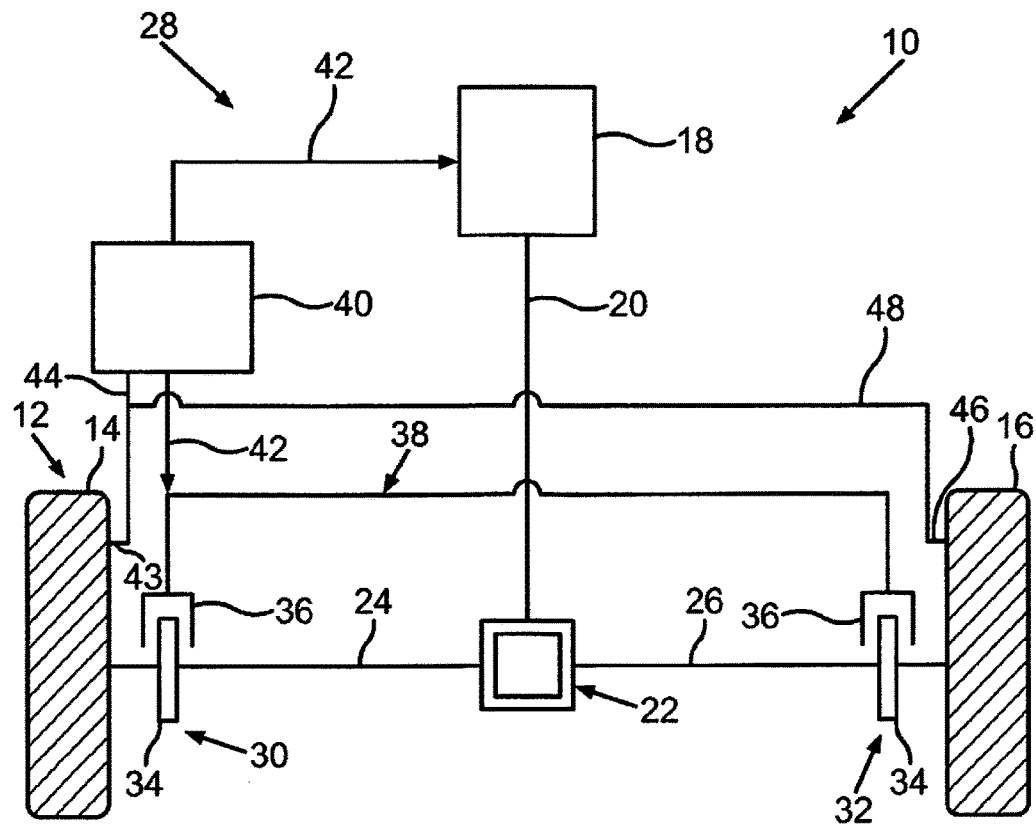
FIG. 1 shows a schematic illustration of a vehicle having at least one drive axle which comprises two driven wheels wherein, within the scope of a method for braking the vehicle, electrical energy is recovered by means of at least one recuperative brake during an anti-lock braking operation.

At least one disclosed embodiment relates to a method for braking a vehicle, in particular a motor vehicle, which is moving along a roadway, by means of a brake device of the vehicle. The brake device comprises at least one friction brake and at least one recuperative brake for braking at least one wheel of the vehicle. In the method, an anti-lock braking operation is carried out by means of the brake device. Within the scope of this anti-lock braking operation, at least one braking torque which is to be applied or is applied to the wheel by the brake device is limited at least temporarily to a predefinable value by means of a regulating device of the vehicle, to prevent, at least temporarily, the wheel from locking relative to the roadway. What is referred to as an anti-lock brake system or what is referred to as an automatic brake lock preventer is therefore formed by the regulating device of the vehicle and the brake device.

To implement operation of the vehicle which is particularly efficient and efficient in terms of energy consumption, there is provision that the braking torque for braking the wheel is applied to the wheel at least partially by the recuperative brake at least during part of the entire duration of the anti-lock braking operation. Disclosed embodiments are based on the concept of not switching off the recuperative brake during the anti-lock braking operation and therefore of not applying the braking torque exclusively by means of the friction brake during the anti-lock braking operation but rather of using the recuperative brake during the anti-lock braking operation, that is to say during an anti-locking operating mode of the brake device which is brought about by means of the regulating device, and of applying the braking torque for braking the wheel to the wheel at least partially by the recuperative brake.

Therefore, energy, in particular electrical energy, can be acquired or recovered by means of the recuperative brake during the anti-lock braking operation. This recovered electrical energy can be used to operate at least one electrical load of the vehicle and/or to drive the vehicle by means of at least one electric motor. If the recuperative brake were not to be used, that is to say were to be switched off, during the anti-lock braking operation, it would not be possible to recover any energy and the energy for driving the vehicle and/or for operating the at least one electric load would have to be made available in some other way. This would lead to an increased consumption of energy and therefore would adversely affect the efficient operation of the motor vehicle. The disclosed method permits energy which would conventionally be lost as thermal energy to be recovered during anti-lock braking operations.

In a further disclosed embodiment, a first braking torque portion which is applied to the wheel by the friction brake at least during part of the duration of the anti-lock braking operation is brought about by means of the regulating device while a second braking torque portion which is applied to the wheel by the recuperative brake is kept constant. There can be provision that the friction brake is at least temporarily switched off during the anti-lock braking operation, with the result that the braking torque relating to the friction brake and the recuperative brake is applied exclusively by the recuperative brake. However, if the recuperative brake is not sufficient to brake the wheel sufficiently, then a respective braking torque portion is applied to the wheel both by the friction brake and by the recuperative brake during the anti-lock braking operation or at least during part of the duration of the anti-lock braking operation.

In this context, the wheel-selective regulation of the friction braking slip, that is to say the limitation of the braking torque, may be carried out entirely by means of the friction brake, while the second braking torque portion which is applied by the recuperative brake is kept as large as possible. As result, during the anti-lock braking operation a particularly large amount of energy can be recuperated by means of the recuperative brake, with the result that a particularly efficient operating mode of the vehicle can be implemented.

The recovered electrical energy can be stored or buffered, for example, in an electrical storage device, in particular in a battery of the vehicle. In addition, it is possible to feed the recuperated energy directly to a load, that is to say without buffering in a storage device.

The use of the recuperative brake during the anti-lock braking operation can permit a particularly high recuperation performance, in particular on roadways with a low coefficient of friction of the surface of the roadway. The method is particularly beneficial in the winter since owing to snow and ice on the surface of the roadway it is possible for anti-lock braking operations, that is to say for activation of the anti-lock brake system, to occur frequently.

To ensure reliable braking of the wheel and therefore of the vehicle as well as at the same time sufficient lateral stability, in a further disclosed embodiment there is provision that a first braking torque portion which is applied to the wheel by the friction brake is limited to at least one predefinable threshold value by means of the regulating device during the anti-lock braking operation.

In another disclosed embodiment, a second braking torque portion which is applied to the wheel by the recuperative brake is limited to at least a second predefinable threshold value by means of the regulating device during the anti-lock braking operation. If, for example, recuperation without the participation of the friction brake occurs during the anti-lock braking operation, the stability of the vehicle, in particular of an axle comprising the wheel, can be regulated above the second threshold value, because the axle can be a driven axle.

If both use of the friction brake and use of the recuperative brake occur during the anti-lock braking operation, for example respective regulators for regulating the friction brake or for regulating the recuperative brake are linked to one another, with the result that, for example, a regulating algorithm which operates in parallel is provided. Regulating thresholds, that is to say first threshold values of the regulator for regulating the friction brake can be very different depending on the situation.

To implement an operating mode of the motor vehicle which is particularly efficient and at the same time particularly stable in terms of driving, in a further disclosed embodiment there is provision that the first threshold value is greater than the second threshold value. This disclosed embodiment is based on the concept of linking the two threshold values, that is to say the two regulating thresholds of the regulator for regulating the recuperative brake and of the regulator for regulating the friction brake, to one another.

By means of the difference which is provided in this way between the threshold values or regulating thresholds it is possible to quickly reduce the braking torque portion of the recuperative brake during the anti-lock braking operation as far as a braking operation which is brought about, with respect to the recuperative brake and the friction brake, exclusively by the friction brake.

To implement a particularly high degree of driving stability during the anti-lock braking operation while a respective braking torque portion is applied to the wheel both by the friction brake and by the recuperative brake, there is provision for the linking of the two regulating thresholds or threshold values to be carried out in such a way that during the anti-lock braking operation the second threshold value is predefined as a function of the first threshold value. In other words, there may be provision that the regulating threshold of the recuperative brake is coupled to the regulating threshold of the friction brake with an applicable offset, that is to say with a predefinable distance.

This ensures that the wheel can be regulated for a particularly good braking performance. If the vehicle has, for example, a plurality of wheels which are to be braked, this can make it possible for the individual wheels to be able to be regulated individually for respective, particularly good braking performances. At the same time, a particularly large part of the braking torque can be applied by the recuperative brake, with the result that a particularly large amount of energy can be recuperated.

Finally, it has proven particularly beneficial if the application of the braking torque which is brought about at least partially by the recuperative brake is carried out during a first part of the entire duration of the anti-lock braking operation and does not occur during a second part of the entire duration of the anti-lock braking operation which is chronologically subsequent to the first part of the duration, wherein during the second part of the duration the braking torque is applied to the wheel by the friction brake. In other words, the braking of the wheel during the first part of the duration with respect to the friction brake and the recuperative brake is brought about exclusively by the recuperative brake or partially by the recuperative brake and partially by the friction brake, wherein the braking of the wheel during the second part of the duration with respect to the friction brake and the recuperative brake is brought about exclusively by the friction brake. This permits particularly short braking distances and a high driving stability to be achieved.

Another disclosed embodiment relates to a vehicle, in particular a motor vehicle and, in particular, a hybrid vehicle, having a brake device for braking the vehicle which is moving along a roadway. The brake device comprises at least one friction brake and at least one recuperative brake for braking at least one wheel of the vehicle. Furthermore, the brake device comprises at least one regulating device. The regulating device is configured to carry out an anti-lock braking operation. In this anti-lock braking operation, at least one braking torque which is applied or is to be applied to the wheel by the brake device is limited at least temporarily to a predefinable value by means of the regulating device, to prevent, at least temporarily, the wheel from locking relative to the roadway. In other words, an anti-lock brake system, which is usually also referred to as an automatic anti-lock preventer, is provided by the brake device and the regulating device.

To be able to implement an operating mode of the vehicle which is particularly efficient and favorable in terms of the consumption of energy there is provision according to the disclosed embodiments that the brake device is configured to apply the braking torque for braking the wheel to the wheel at least partially by the recuperative brake at least during part of the entire duration of the anti-lock braking operation. Refinements of one disclosed embodiment are to be considered refinements of the other disclosed embodiments.

In a further disclosed embodiment, there is provision that during an anti-lock braking operation the friction brake is not used or is not used exclusively but instead the recuperative brake is also used to brake the wheel. As result, energy can be recovered not only during normal braking operations during which limitation of the braking torque which is brought about by the regulating device does not occur but instead also during anti-lock braking operations. This energy can then be used to operate at least one electric load and/or to drive the vehicle. As result, in particular, a particularly high range of the vehicle over which the vehicle can be driven purely electrically and therefore without emissions can be implemented.

The features and combinations of features which are specified above in the description and the features and combinations of features which are specified below in the description of the figures and/or shown solely in the figures can be used not only in the respectively specified combination but also in other combinations or alone without departing from the scope of the disclosed embodiments.

Identical or functionally identical elements are provided with the same reference symbols in the figures.

FIG. 1 shows a schematic illustration of a detail of a vehicle which is referred to in its entirety by 10 and which can be embodied as a hybrid vehicle or as an electric vehicle. The vehicle 10 comprises an axle 12 with two wheels 14, 16. The wheels 14, 16 are driven wheels, with the result that the axle 12 is a driven axle. The axle 12 is therefore also referred to as a drive axle. The axle 12 can be a front axle or a rear axle of the vehicle 10 here.

The vehicle 10 comprises an electric machine 18 which can be operated in a generator operating mode and in a motor operating mode. In the motor operating mode, the electric machine 18 functions as an electric motor. The electric machine 18 comprises a rotor which is coupled in a rotationally fixed fashion to an output shaft 20 of the vehicle 10. In the motor operating mode, the output shaft 20 can be driven by means of the electric machine 18. The vehicle 10 also comprises a differential 22 of the axle 12. In the motor operating mode, the differential 22 can be driven by the electric machine 18 via the output shaft 20.

The differential 22 is usually also referred to as a differential gear or axle drive, since, for example during cornering of the vehicle 10, it permits different rotational speeds of the wheels 14, 16 while the wheels 14, 16 are driven. The wheels 14, 16 are coupled to the differential 22 via respective drive shafts 24, 26 and therefore in the motor operating mode of the electric machine 18 they can be driven thereby via the differential 22 and the output shaft 20.

In the generator operating mode, the electric machine 18 is driven by the wheels 14, 16 via the drive shafts 24, 26, the differential 22 and the output shaft 20. As a result, kinetic energy of the vehicle 10 which is moving along a roadway can be converted into electrical energy by braking the vehicle 10 by means of the electric machine 18. As a result, it is possible to recover energy, which is also referred to as recuperation. The vehicle 10 can roll on the roadway by means of the wheels 14, 16.

The vehicle 10 also comprises a brake device which is referred to in its entirety by 28. The brake device 28 comprises a friction brake 30 which is assigned to the wheel 14 and a friction brake 32 which is assigned to the wheel 16. By means of the friction brake 30, the wheel 14 can be braked, wherein the wheel 16 can be braked by means of the friction brake 32. Since the differential 22 permits different rotational speeds of the wheels 14, 16, wheel-specific or wheel-selective braking can take place by means of the friction brakes 30, 32. This means that the wheels 14, 16 can be braked to differing degrees by means of the friction brakes 30, 32.

The respective friction brake 30, 32 comprises a brake disk 34 which is coupled in a rotationally fixed fashion to the respective wheel 14, 16, and a brake caliper 36. The brake caliper 36 is attached at least indirectly to a body, in particular a bodywork of the vehicle 10, wherein the respective wheel 14, 16 can rotate relative to the body and therefore relative to the brake caliper 36.

As is apparent from FIG. 1, the respective brake disk 34 is accommodated at least partially in the brake caliper 36. To brake the respective wheel 14, 16, at least one brake piston, which is mounted on the brake caliper 36 so as to be movable relative thereto, is moved in contact with the corresponding brake disk 34. As result, frictional contact occurs between the brake disk 34 and the brake piston, as result of which the respective brake disk 34 and therefore the respective corresponding wheel 14, 16 is braked.

The movement of the piston in contact with the brake disk 34 is brought about, for example, hydraulically, that is to say by means of a hydraulic fluid. For this purpose, the hydraulic fluid is fed to the respective brake caliper 36 and to the respective pistons via corresponding lines 38. The friction brakes 30, 32 are therefore a component of a hydraulic brake system. In other words, the respective friction brake 30, 32 is embodied as a hydraulic friction brake.

The brake device 28 also comprises the electric machine 18 which acts in its generator operating mode as what is referred to as a recuperative brake. By operating the electric machine 18 in its generator operating mode, the wheels 14, 16 are in fact braked. It is therefore possible to brake the respective wheel 14, 16 in relation to the respective friction brake 30, 32 and the recuperative brake exclusively by means of the recuperative brake, exclusively by means of the friction brake 30, 32 or simultaneously by means of the recuperative brake and by means of the respective friction brake 30, 32. If the recuperative brake (electric machine 18) is used for braking, energy is recuperated.

The vehicle 10 can also comprise an electric storage device, for example a battery, which is not illustrated in FIG. 1 and in which the electrical energy, which is recuperated by means of the electric machine 18 in the generator mode thereof, can be stored. The recuperated and, for example, stored electrical energy can be used, for example, to operate at least one electric load of the vehicle 10. Alternatively or additionally, the electric machine 18 can be supplied in its motor operating mode with the electric energy, with the result that the vehicle 10 can thereby be driven by means of the electric machine 18, and therefore purely electrically, that is to say without emissions. By recuperating energy, it is possible to implement a particularly high range over which the vehicle 10 can be driven electrically without, for example, having to connect the battery to a power supply network in the meantime and thereby charge it.

As is apparent from FIG. 1, the brake device 28 also comprises a regulating device 40 for regulating the recuperative brake, in particular, an electric machine 18, and the respective friction brake 30, 32. This regulating capability is illustrated here in FIG. 1 by direction arrows 42 which lead away from the regulating device 40 and to the electric machine 18 or to the friction brakes 30, 32. The regulating device 40 is a component of the vehicle 10 and is therefore different from the driver of the vehicle 10.

The wheel 14 is assigned a rotational speed sensor 43 by means of which the rotational speed of the wheel 14 can be detected. The rotational speed sensor 43 makes available a first rotational speed signal which characterizes the rotational speed of the wheel 14, is transmitted to the regulating device 40 from the rotational speed sensor 43, for example via a line 44, and is received by the regulating device 40.

Accordingly, the wheel 16 is assigned a rotational speed sensor 46 by means of which the rotational speed of the wheel 16 is detected. The rotational speed sensor 46 makes available a second rotational speed signal which characterizes the rotational speed of the wheel 16 and which is transmitted to the regulating device 40 from the rotational speed sensor 46, for example via a line 48 and is received by the regulating device 40. As result it is possible to operate or regulate the brake device 28 or the recuperative brake and the friction brakes 30, 32 as a function of the rotational speed signals.

In the text which follows, a method for braking the vehicle 10 is described, wherein for the sake of clarity this method is explained using the example of the wheel 14 and the friction brake 30 which is assigned to the wheel 14. However, what has been described above and what is described below with respect to the wheel 14 and with respect to the friction brake 30 can also be readily transferred to the wheel 16 and the friction brake 32 which is assigned to the wheel 16.

To brake the wheel 14, a braking torque is applied to the wheel 14 by the brake device 28. This braking torque is also referred to as a total braking torque. Depending on the level or the value of the braking torque which is to be applied, it can be applied to the recuperative brake and the friction brake 30 exclusively by the friction brake 30, exclusively by the recuperative brake or partially by the recuperative brake and partially by the friction brake 30.

The total braking torque is predefined, for example, by the driver of the vehicle 10 in such a way that the driver activates, in particular presses, an operator control element, in particular a brake pedal.

Within the scope of the method, there is then provision for an anti-lock braking operation to be carried out. Within the scope of such an anti-lock braking operation, the braking torque (total braking torque) which is to be applied to the wheel 14 by the brake device 28 is limited at least temporarily to a predefinable value by means of the regulating device 40, to avoid locking of the wheel 14 relative to the roadway. This predefinable value is lower here than a predefined value which is actually predefined by the driver by activation of the brake pedal. In other words, if the anti-lock braking operation was not carried out by means of the regulating device 40, then the total braking torque which is predefined by the driver by activating the brake pedal and applied by means of the brake device 28 would be higher than the predefined value which would lead to locking of the wheel 14. The regulating device 40 therefore permits a total braking torque to be brought about or set which is lower than the braking torque which is requested by the driver by activating the brake pedal, specifically without the driver having to do anything to reduce or limit the braking torque, for example having to change (reduce) the current activation of the brake pedal.

The anti-lock braking operation is carried out here as a function of the respective rotational speed signal to detect possible locking of the wheel 14 and counteract this possible locking.

What is referred to as an anti-lock brake system is therefore provided by the brake device 28 and the regulating device 40, with the result that, on the one hand, the slip of the wheel 14 during the anti-lock braking operation remains as close as possible to a value which is an optimum one for the implementation of a particularly high deceleration and, on the other hand, locking of the wheel 14 is avoided. As result, the driving stability of the vehicle 10 can be ensured. The slip or the slip value which is beneficial for the implementation of a particularly high braking performance is dependent here on the state of the roadway and/or the coefficient of friction of the surface of the roadway.

To implement an operating mode of the vehicle 10 which is particularly efficient and favorable in terms of the consumption of energy, there is then provision in the method that the braking torque for braking the wheel 14 is applied to the wheel 14 at least partially by the recuperative brake (electric machine 18) at least during part of the entire duration of the anti-lock braking operation. As a result, energy which would be lost without being used as thermal energy when the recuperative brake is switched off during the anti-lock braking operation is recuperated in the anti-lock braking operation.

In this context it is possible to provide that the braking torque is applied in relation to the recuperative brake and the friction brake 30 exclusively by the recuperative brake at least during part of the duration of the anti-lock braking operation. If, for example, a maximum braking torque which can be applied by the recuperative brake is not sufficient to apply the predefined total braking torque to the wheel 14, the friction brake 30 is also additionally used to apply the total braking torque by the brake device 28. In this case, the total braking torque comprises a first braking torque portion which is applied by the friction brake 30, and a second braking torque portion which is applied to the wheel 14 by the recuperative brake.

There may be provision here that the second braking torque portion is kept as large as possible and at the same time wheel-selective regulation of the total braking torque or of the friction brake slip is carried out by means of the hydraulic brake system. In this context there is provision, for example, that, while the second braking torque portion is kept at least essentially constant, the first braking torque portion is varied by means of the regulating device 40. This means that, for example, the first braking torque portion is reduced from a first value to a second value, and subsequently increased again to a third value, wherein the third value can be larger than the second value and equal to or smaller than the first value.

This disclosed embodiment of the first braking torque portion is carried out, for example, by means of at least one valve by means of which a pressure of the hydraulic fluid is limited to a predefinable value.

Figure 2:
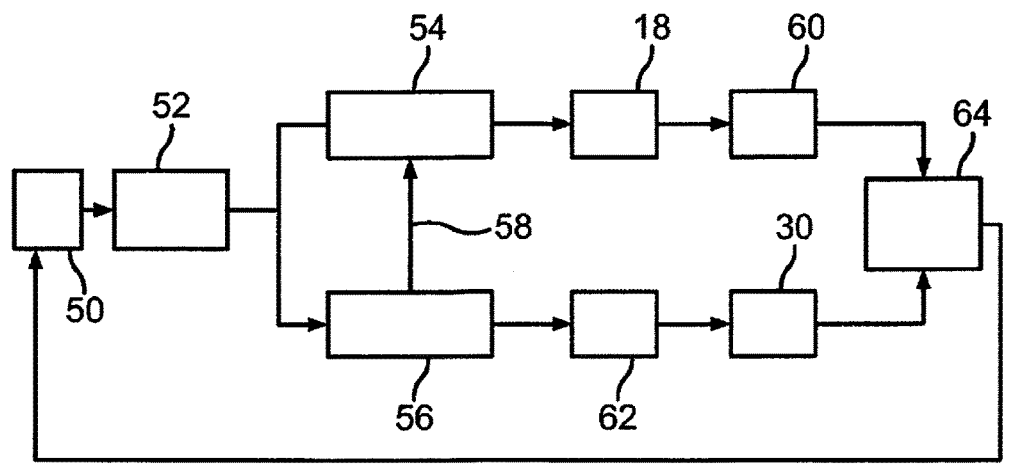
FIG. 2 shows a flowchart illustrating the method.

FIG. 2 illustrates the method by means of a flowchart. The respective rotational speeds of the wheels 14, 16 are detected by means of the rotational speed sensors 43, 46, and on the basis thereof respective wheel speeds 50 of the wheels 14, 16 are determined. A calculation 52 of the vehicle speed and of the respective wheel slips is carried out as a function of the wheel speeds 50.

A first regulator 54 is used for regulating the electric machine 18, wherein a second regulator 56 is used for regulating the friction brake 30. The concept on which the method is based is then to combine respective threshold values, referred to as regulating thresholds, of the regulators 54, 56 with one another. By means of the regulating device 40, the friction brake 30 is regulated using the regulator 56, wherein the recuperation brake is regulated by means of the regulating device 40 using the regulator 54. During the anti-lock braking operation, the first braking torque portion which is applied to the wheel 14 by the friction brake 30 is limited to at least a first predefinable threshold value (regulating threshold), with the result that the regulator 56 can also be referred to as an ABS regulator of the hydraulic brake system.

By means of the regulating device 40, the second braking torque portion which is applied to the wheel 14 by the recuperative brake is limited to at least a second predefinable threshold value (regulating threshold) using the regulator 54 during the anti-lock braking operation, with the result that the regulator 54 can also be referred to as a recuperation-limiting regulator. In this context, the second threshold value, that is to say the regulating threshold of the ABS regulator, is greater than the first threshold value, that is to say the regulating threshold of the recuperation-limiting regulator.

As is illustrated by a directional arrow 58 in FIG. 2, the second threshold value is predefined as a function of the first threshold value. This means that a regulating value predefinition, in particular, a setpoint slip, is issued by the regulator 56 to the regulator 54. There may be provision that the second predefinable threshold value is set with a predefinable distance from the first threshold value. Depending on the driving situation, different regulating thresholds (first threshold values) of the ABS regulator can be predefined, with the result that, for example in the case of different successive anti-lock braking operations which are spaced chronologically apart from one another different second threshold values can be predefined. The setting of the respective regulating thresholds which are fed to the regulators 54, 56 is carried out here as a function of the calculation 52.

As is apparent from FIG. 2, the electric machine 18 is regulated in its generator operating mode by means of the regulator 54 during the anti-lock braking operation, with the result that the second braking torque portion 60 which is to be applied by the recuperative brake is set thereby.

The regulation of the friction brake 30 by means of the regulator 56 results in a brake pressure 62 of the hydraulic fluid, from which in turn the first braking torque portion which is to be applied by the friction brake 30 results. The first braking torque portion and the second braking torque portion together produce the total braking torque to brake the wheel 14, wherein the total braking torque is denoted by 64 in FIG. 2. The at least temporary braking of the wheel 14 brings about at least temporary reduction of the wheel speeds 50, which can be detected again by means of the rotational speed sensors 43, 46. Subsequent to this, the described sequence proceeds once more. This procedure is repeated, for example, until the vehicle 10 comes to a standstill or until the driver only requests a braking torque which is so low that it would not cause the wheel 14 to lock.

As result of the specified setting of the regulating threshold of the recuperation limiting regulator as a function of the regulating threshold of the ABS regulator, a difference comes about between the regulating thresholds, which difference causes the second braking torque portion which is to be applied by the recuperation brake to drop quickly as far as purely hydraulic braking. Since the regulating threshold of the recuperation-limiting regulator is not larger than the regulating threshold of the ABS regulator, a particularly high level of driving stability can be ensured. The linking of the two regulating thresholds is therefore carried out in such a way that the individual wheels 14, 16 can be regulated hydraulically on an individual basis for a particularly good braking performance and at the same time as large a part of the total braking torque as possible can be applied by the recuperative brake. As a result, a particularly large amount of energy can be recuperated during the anti-lock braking operation.

Figure 3:
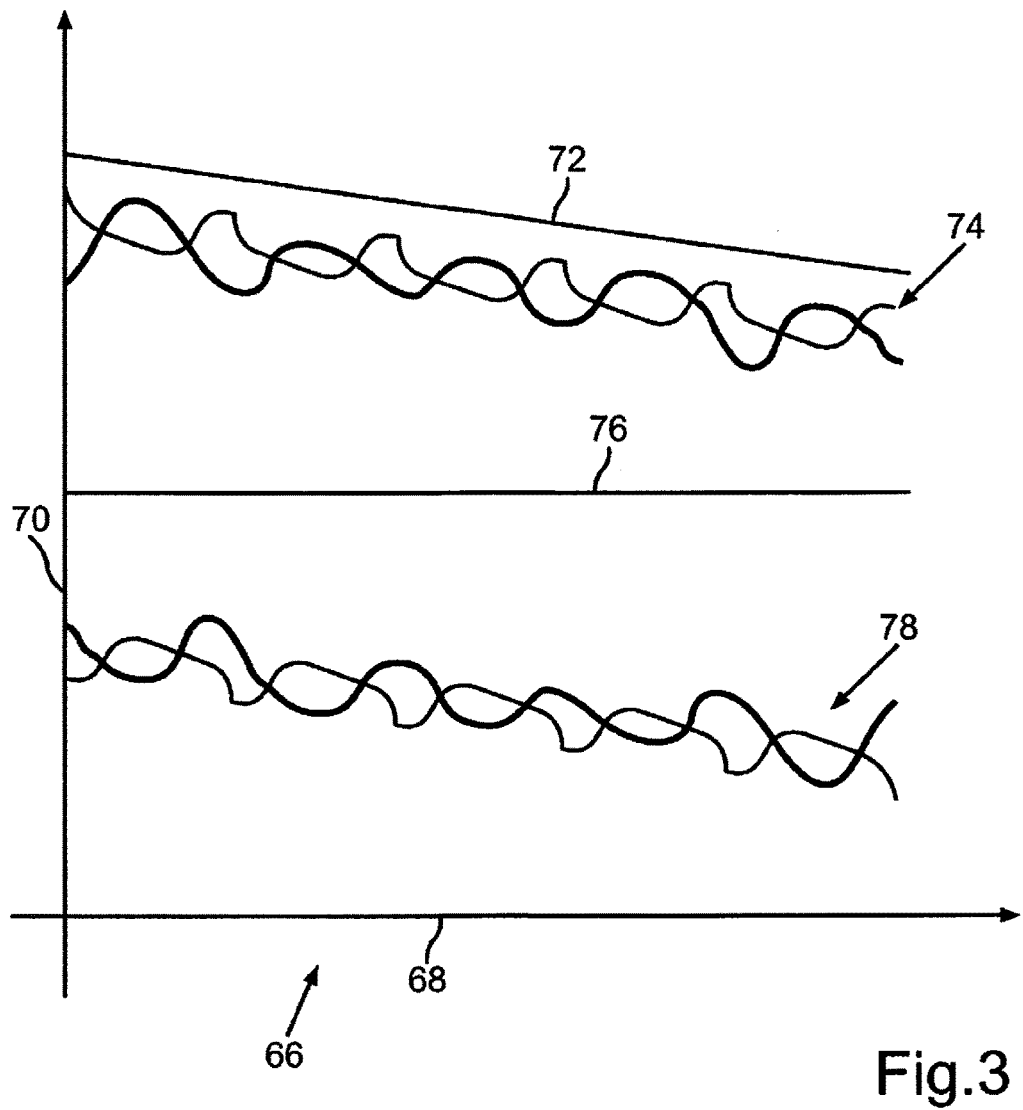
FIG. 3 shows a diagram with time profiles illustrating the method.

FIG. 3 shows a diagram 66 for illustrating a relationship between braking torques and the regulation of the brake device 28. The time is plotted on the abscissa 68 of the diagram 66, while the braking torque is plotted on the ordinate 70. A first time profile 72 characterizes the vehicle reference speed, while the time profiles 74 characterize the wheel speeds. A time profile 76 characterizes the braking torque on an axle basis, while the time profiles 78 illustrate on a wheel-specific basis the braking torque portions or braking torques which are applied by the respective friction brake 30, 32.

BACKGROUND

Methods and vehicles of this type are sufficiently known from the general prior art, in particular from the mass production of passenger cars. The vehicle comprises at least one wheel by means of which the vehicle can roll on a roadway and as a result move along the roadway. If the vehicle is embodied, for example, as an at least two-track motor vehicle, the vehicle comprises at least two axles which are arranged spaced apart from one another in the longitudinal directions of the vehicle. These axles each comprise at least two wheels by means of which the vehicle can roll on the roadway. At least one of the wheels is a driven wheel by means of which the vehicle can be driven. The two wheels are usually wheels which are driven at least one of the axles.

If, for example, the wheels of the front axle are the driven wheels, the vehicle is embodied as a front-drive vehicle or as a vehicle with front wheel drive if the wheels of the rear axle are not driven. The rear axle is then what is referred to as a trailing axle, while the front axle is a driven axle. Conversely, the vehicle is embodied as a rear drive vehicle or as a vehicle with rear drive if the wheels of the rear axle are the driven wheels while the wheels of the front axle are not driven. If the wheels of both axles are driven, the vehicle has all-wheel drive or four-wheel drive.

The vehicle also comprises a brake device by means of which the vehicle which is moving along the roadway can be braked. For this purpose, at least one of the wheels of the vehicle is braked by means of the brake device. To brake the at least one wheel, at least one braking torque is applied to the wheel by the brake device.

In vehicles or motor vehicles with a conventional drive, the brake device comprises for this purpose at least one friction brake which is assigned to the wheel and by means of which the wheel can be braked. Such a friction brake comprises, for example, a brake disk which is coupled in rotationally fixed fashion to the wheel and a brake caliper which is attached to a wheel carrier and is therefore fixed to the body and by means of which the brake disk which rotates along with the wheel can be braked. The friction brake is usually activated hydraulically, with the result that the friction brake is therefore embodied as a hydraulic brake.

In vehicles or motor vehicles with alternative drives, for example in hybrid vehicles, the brake device also comprises at least one so-called recuperative brake. By means of such a recuperative brake, energy can be recovered during the braking of the wheel and therefore of the vehicle in that, for example, during the braking of the vehicle kinetic energy is converted via the recuperative brake into electrical energy, that is to say electric current. For this purpose, the recuperative brake comprises, for example, at least one generator which is driven by the wheel to brake the wheel and as a result converts mechanical energy into electrical energy. The electrical energy which is acquired or recovered in this way can be stored in at least one electrical storage device, in particular in a battery, of the hybrid vehicle.

The total braking torque which is to be applied to the wheel by the brake device is predefined, for example, by the driver of the vehicle in such a way that the driver activates, in particular presses, a brake pedal. The braking torque which is requested as a result can then be applied to the wheel, for example partially by the friction brake and partially by the recuperative brake.

Furthermore, anti-lock brake systems, which are usually also referred to as automatic lock preventers, are known from the general prior art. Such anti-lock brake systems serve to carry out braking operations with at least virtually maximum utilization of the frictional engagement between the tire and the roadway, referred to as anti-lock braking operations. In such an anti-lock braking operation, the braking torque which is to be applied to the at least one wheel by the brake device is limited at least temporarily to a predefinable value by means of a regulating device of the anti-lock brake system, to prevent, at least temporarily, the wheel from locking relative to the roadway.

This limitation of the braking torque is carried out, for example, as a function of at least one regulating value which characterizes the slip of the wheel relative to the roadway. The idea on which such an anti-lock brake system is based is that maximum braking decelerations can be achieved as a function of the state of the roadway and the tire of the wheel given specific slip values. By limiting the braking torque, the braking torque is set in such a way that, at least during the greater part of the anti-lock braking operation, the slip is as close as possible to the optimum slip value for the greatest possible braking deceleration, with the result that, on the one hand, very strong deceleration or braking of the vehicle can be implemented but, on the other, the wheel can be prevented from locking. As result, the vehicle continues, for example, to be steerable and stable, since the non-locking wheel can still absorb lateral guidance forces.

DE 10 2010 054 620 A1 discloses a method for determining braking torques of a vehicle with a traction battery, with at least one recuperative brake and at least one friction brake on at least one drive axle with the inclusion of a lateral-dynamic driving state of the vehicle. Such a traction battery is the abovementioned electrical storage device in which electrical energy, which has been recovered by means of the recuperative brake, can be stored.

The stored electrical energy can be used, for example, for electric loads and/or for driving the vehicle by means of an electric motor, with the result that operation which is particularly efficient in terms of energy and, in the case of a hybrid vehicle in particular, operation which has low consumption of fuel can be implemented. For example an electric machine which can be used as an electric motor in a motor operating mode and as the abovementioned generator in a generator operating mode can be used as the electric motor. However, it has become apparent that the operation of such a conventional vehicle is worthy of improvement in terms of the efficiency and the implementation of a particularly low consumption of energy.

The invention claimed is:

1. A method for braking a transportation vehicle moving along a roadway, the method comprising:
   carrying out an anti-lock braking operation using a brake device that includes at least one friction brake and at least one recuperative brake for braking at least one wheel of the transportation vehicle; and
   limiting application of at least one braking torque during the anti-lock braking operation, wherein the at least one braking torque applied to the at least one wheel by the brake device is limited at least temporarily to a predefinable value by a regulating device of the transportation vehicle, to prevent, at least temporarily, the at least one wheel from locking relative to the roadway, wherein the at least one braking torque for braking the at least one wheel is applied to the at least one wheel at least partially by the at least one recuperative brake at least during part of an entire duration of the anti-lock braking operation, wherein a total braking torque applied to the at least one wheel by the brake device is predefined by a driver of the transportation vehicle activating a brake pedal of the transportation vehicle, which results in a requested braking torque for application to the at least one wheel partially by the at least one friction brake and partially by the at least one recuperative brake, wherein, under control of the at least one regulating device, the brake device varies a first amount of braking torque applied to the at least one wheel by the at least one friction brake at least during part of the entire duration of the anti-lock braking operation, and simultaneoulsy, under control of the at least one regulating device, the brake device maintains a second constant amount of braking torque applied to the at least one wheel by the at least one recuperative brake, wherein the entire duration of the anti-lock braking operation consists of a first part and a second part, wherein the second part of the entire duration of the anti-lock braking operation is chronologically subsequent to the first part of the entire duration of the anti-lock braking operation, wherein the application of the braking toque brought about at least partially by the at least one recuperative brake is carried out only during the first part of the entire duration of the anti-lock braking operation and does not occur during the second part of the entire duration of the anti-lock braking operation, wherein, during the first part of the entire duration of the anti-lock braking operation, the first amount of braking torque applied to the at least one wheel by the at least one friction brake is varied, and simultaneously, the second amount of braking torque applied to the at least one wheel by the at least one recuperative brake is maintained constant, and wherein, during the second part of the entire duration of the anti-lock braking operation, braking torque is applied to the wheel exclusively by the at least one friction brake to shorten the braking distance.

2. The method of claim 1, further comprising limiting the first amount of a braking torque applied to the wheel by the at least one friction brake to at least a first predefinable threshold value under control of the regulating device during the anti-lock braking operation.

3. The method of claim 1, further comprising limiting an amount of braking torque portion applied to the at least one wheel by the at least one recuperative brake to at least a predefinable threshold value by the regulating device during the anti-lock braking operation.

4. A transportation vehicle comprising:
a brake device for braking the transportation vehicle while the vehicle is moving along a roadway;
at least one regulating device; and
at least one wheel,
wherein the brake device comprises at least one friction brake and at least one recuperative brake for braking the at least one wheel of the transportation vehicle,
wherein the at least one regulating device controls performance of an anti-lock braking operation which at least one braking torque applied to the at least one wheel by the brake device,
wherein, during the application of the at least one braking torque, the at least one braking torque is limited at least temporarily to a predefinable value by the regulating device to prevent, at least temporarily, the at least one wheel from locking relative to the roadway, wherein the brake device applied the at least one braking torque for braking the at least one wheel to the at least one wheel at least partially by the at least one recuperative brake at least during part of the entire duration of the anti-lock braking operation, wherein a total braking torque applied to the wheel by the brake device is predefined by a driver of the transportation vehicle activating a brake pedal of the transportation vehicle, which results in a request braking torque for application to the at least one wheel partially by the at least one friction brake and partially by the at lest one recuperative brake, wherein, under control of the at least one regulating device, the brake device varies a first amount of braking torque applied to the at least one wheel by the at least one friction brake at least during part of the entire duration of the anti-lock braking operation, and simultaneously, under control of the at least one regulating device, the brake device maintains a constant second amount of braking torque applied to the at least one wheel by the at least one recuperative brake, wherein the entire duration of the anti-lock braking operation consists of a first part and a second part, wherein the second part of the entire duration of the anti-lock braking operation is chronologically subsequent to the first part of the entire duration of the anti-lock braking operation, wherein the application of the braking torque which is brought about at least partially by the at least one recuperative brake is carried out only during the first part of the entire duration of the anti-lock braking operation and does not occur during the second part of the entire duration of the anti-lock braking operation, and wherein, during the first part of the entire duration of the anti-lock braking operation, the first amount of braking torque applied to the at least one wheel by the at least one friction brake is varied, and simultaneously, the second amount of braking torque applied to the at least one wheel by the at least one recuperative brake is maintained constant, and wherein, during the second part of the entire duration of the anti-lock braking operation, the braking torque is applied to the wheel exclusively by the at least one friction brake to shorten the braking distance.

5. The vehicle of claim 4, wherein, under control of the at least one regulating device, the brake device limits the first amount of braking torque applied to the at least one wheel by the at least one friction brake, during the anti-lock braking operation, to at least a first predefinable threshold value.

6. The method of claim 2, further comprising limiting the second amount of braking torque applied to the at least one wheel by the at least one recuperative brake to at least a second predefinable threshold value under control of the regulating device during the anti-lock braking operation.

7. The transportation vehicle of claim 5, wherein, under control of the at least one regulating device, the brake device limits the second amount of braking torque applied to the at least one wheel by the at least one recuperative brake to at least a second predefinable threshold value during the anti-lock braking operation.

8. The transportation vehicle of claim 7, wherein the first threshold value is greater than the second threshold value.

9. The transportation vehicle of clam 7, wherein, during the anti-lock braking operation, the second threshold value is predefined as a function of the first threshold value.

10. The method of claim 6, wherein the first threshold value is greater than the second threshold value.

11. The method of claim 6, wherein, during the anti-lock braking operation, the second threshold value is predefined as a function of the first threshold value.

\* \* \* \* \*